M. E. COMISKEY.
AUTOMOBILE ORNAMENT.
APPLICATION FILED DEC. 22, 1921.

1,435,106.

Patented Nov. 7, 1922.

Inventor:
Michael E. Comiskey
by Chas. F. Perkins Attorney

Patented Nov. 7, 1922.

1,435,106

UNITED STATES PATENT OFFICE.

MICHAEL E. COMISKEY, OF PLYMOUTH, MASSACHUSETTS.

AUTOMOBILE ORNAMENT.

Application filed December 22, 1921. Serial No. 524,205.

*To all whom it may concern:*

Be it known that I, MICHAEL E. COMISKEY, a citizen of the United States, residing at Plymouth, in the county of Plymouth and State of Massachusetts, have invented new and useful Improvements in Automobile Ornaments, of which the following is a specification.

My invention relates to automobile ornaments, and has for its object a rotary ornament capable of displaying a variety of designs while rotated by the motion of the car and the air resistance.

Figure 1:
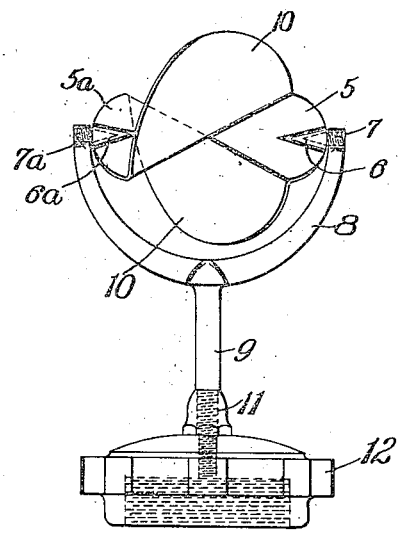
Figure 2:
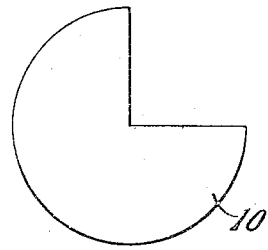
Figure 3:
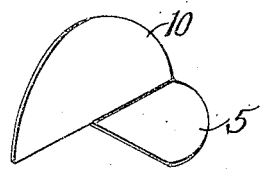

In the accompanying drawing illustrating my invention Fig. 1 is a front elevation of one form of my device; Fig. 2 illustrates the first stage of one method of manufacturing the rotatable device; Fig. 3 illustrates the second stage of the same, and Fig. 4 illustrates a modification of Fig. 1.

For the purpose of describing the form of the rotatable part of the device, I find it convenient to resort to the description of one method of manufacturing it. Let us assume that we take two circular metal discs such as 10, and cut from each a quadrant, an illustration of which is shown in Fig. 2; that we bend one of the adjacent quadrants of each disc at right angles to the main portion, as shown in Fig. 3. These two members are then jointed together by soldering, welding or otherwise, in such relation that the lines coinciding with the angles of the members and correspond with the diameters of the disc shall intersect at right angles midway of their length, as shown in perspective in Fig. 1. I do not mean to state that the manufacture of the device is limited to the particular method described. I am merely using it to assist in describing the form of the device. The rotatable device may be composed of one or of any number of parts, the result of which when assembled is the rotatable structure illustrated in Fig. 1. It may be made of one piece in cast metal, or it may be stamped out of one piece of sheet metal. Therefore I make no claim to novelty in the particular method of manufacture described.

Figure 4:
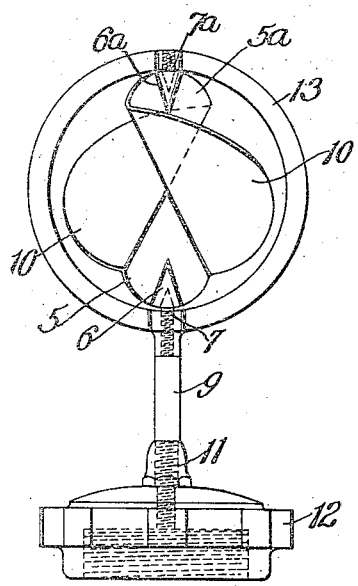

In Fig. 4 I have shown a circular frame 13, instead of the bi-furcated frame 8, shown in Fig. 1. While the substitution of the circular frame for the bi-furcated frame is not necessary, yet the circular frame may be preferred in some instance.

Midway of each quadrant 5—5ª is a bearing to form the axis of rotation. I have shown conical journals 6—6ª which turn on stationary axles 7—7ª supported on the bi-furcated frame 8, which in turn is supported upon the post 9 designed to be secured on the radiator cap 12 of an automobile or mounted upon it in any other ordinary way, for the purpose of rotating when the machine is in motion. It is obvious that the rotatable device may be mounted so as to rotate upon a vertical axis, as illustrated in Fig. 4, or upon an axis at any angle that may be desired.

The blades of the rotatable device may be made of any preferred size and decorated in colors or designs of any character that the user may desire. It may be made of polished metal such as brass or nickel to give a brilliant effect. The rapid rotation of the device by the resistance of the air produces a unique and pleasing effect capable of many variations.

My invention is not limited to the particular means of supporting the rotatable device. I have shown one means, namely, by screw threading the end of the post 9 and drilling and tapping a screw threaded hole in the center of the radiator cap 12 to receive it. In order to adapt the post to radiator caps of different thickness, I provide a screw threaded nut 11 to limit the distance the post may enter the cap 12 and to lock the post more securely to the radiator cap 12. It is obvious that many different well known means may occur to the mechanic for supporting the post 9 and for mounting the rotatable device thereon which would be equivalent to the means shown and would be within the scope of my invention.

The rotatable device may be used in other situations than as automobile ornaments, and may be of any dimensions and for any purpose and be within the scope of my invention.

What I claim and desire to secure by Letters Patent is:

1. An automobile ornament comprising a rotatable device adapted to be rotated by the resistance of the air, consisting of two semi-circular blades arranged with their straight edges intersecting each other midway of their length and with their planes at right angles to each other, combined with two blades consisting of quadrants of a circle arranged in the same plane as each other and at right angles to the semi-circular blades.

2. An automobile ornament comprising a rotatable device adapted to be rotated by the resistance of the air, consisting of two semi-circular blades arranged with their straight edges interesecting each other midway of their length and with their planes at right angles to each other, combined with two blades consisting of quadrants of a circle arranged in the same plane as each other and at right angles to the semi-circular blades, combined with a frame for supporting the rotatable device, the latter being arranged to rotate in said frame on an axis extending through the central radii of said quadrants.

In testimony whereof I have hereunto set my hand in presence of two subscribing witnesses, this 5th day of December 1921.

MICHAEL E. COMISKEY.

Witnesses:
 CHAS. L. PERKINS,
 A. G. SULLIVAN.